Figure 1:
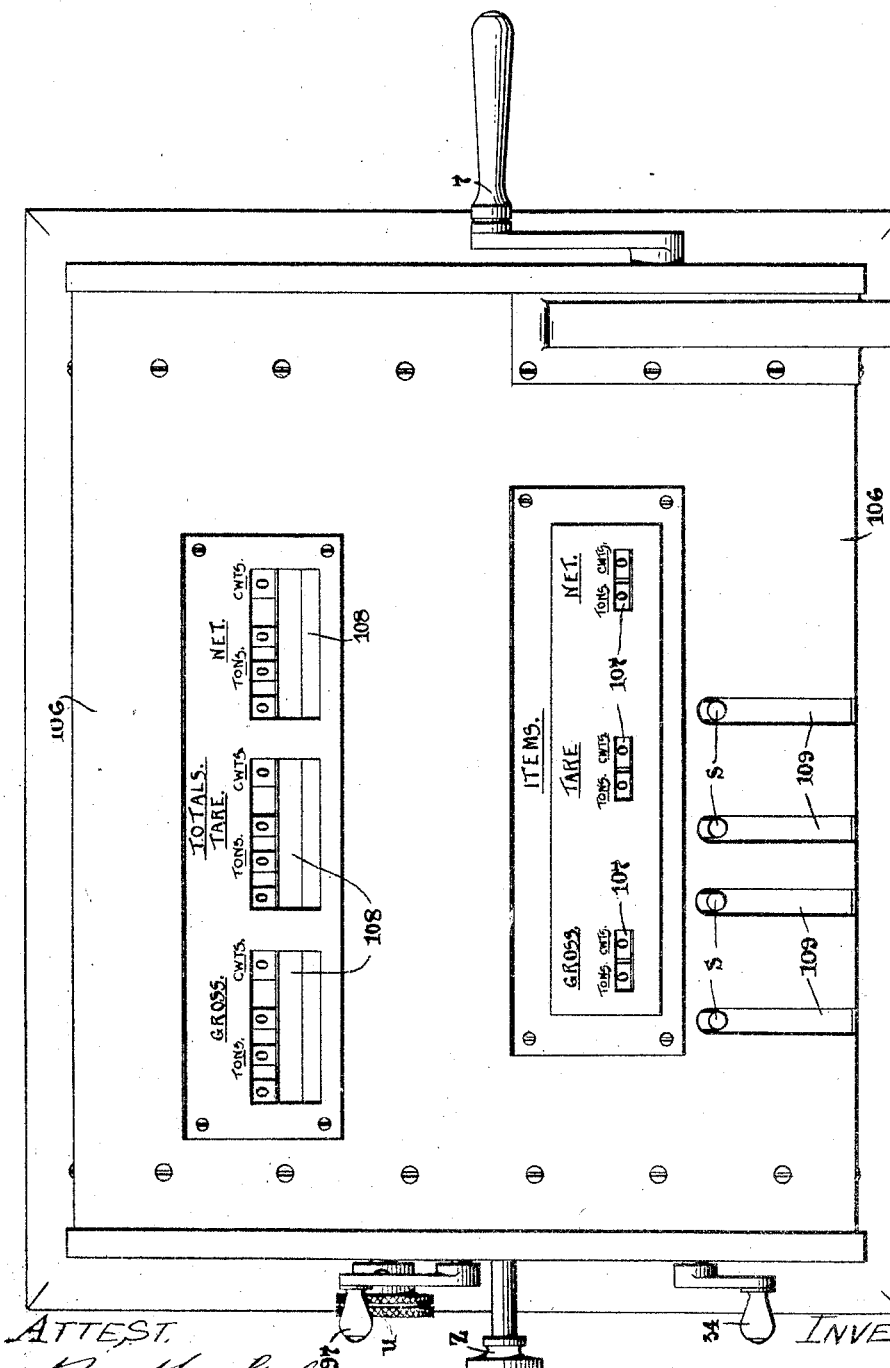

W. SCHOOLING.
ADDING AND SUBTRACTING MACHINE.
APPLICATION FILED MAR. 2, 1909.

977,333.

Patented Nov. 29, 1910.
14 SHEETS—SHEET 1.

ATTEST.
Bent M. Stahl
Edward N. Sexton

INVENTOR
WILLIAM SCHOOLING.
By Spear, Middleton, Donaldson & Spear
ATTY'S

W. SCHOOLING.
ADDING AND SUBTRACTING MACHINE.
APPLICATION FILED MAR. 2, 1909.

977,333.

Patented Nov. 29, 1910.
14 SHEETS—SHEET 2.

ATTEST.
INVENTOR.
WILLIAM SCHOOLING.
By Spear, Middleton, Donaldson & Spear
ATTY'S.

W. SCHOOLING.
ADDING AND SUBTRACTING MACHINE.
APPLICATION FILED MAR. 2, 1909.
977,333.
Patented Nov. 29, 1910.
14 SHEETS—SHEET 3.
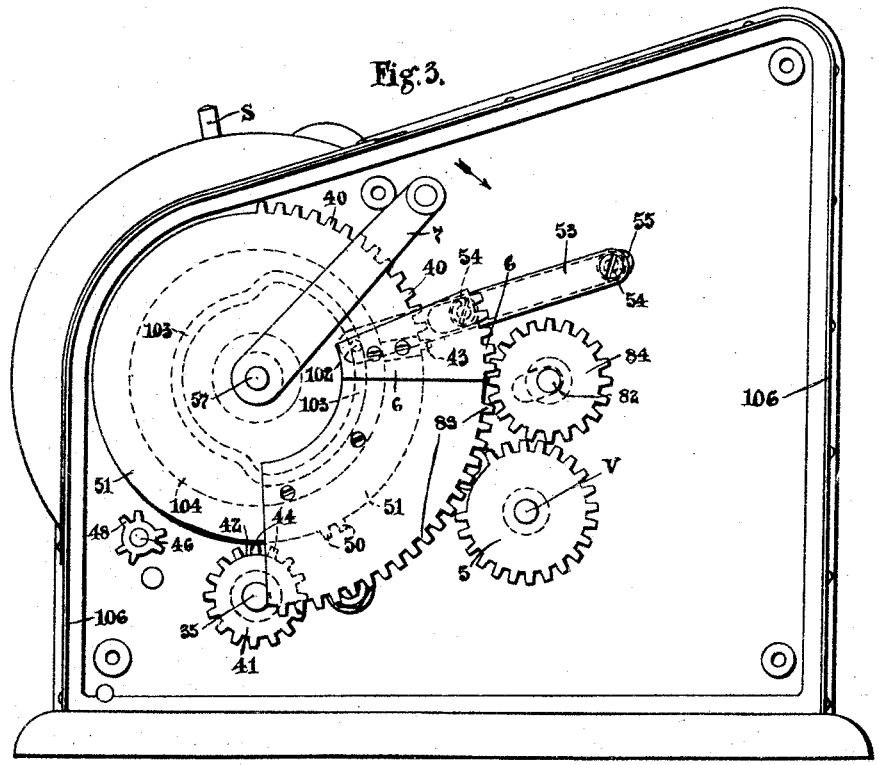
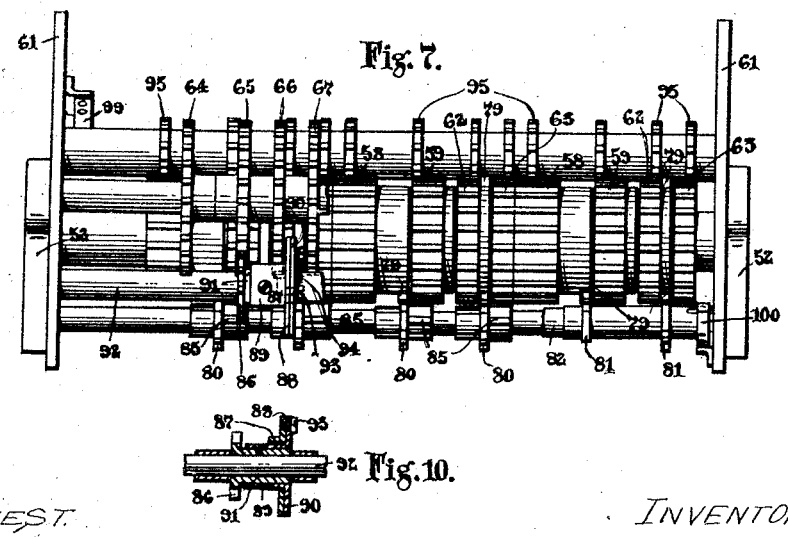

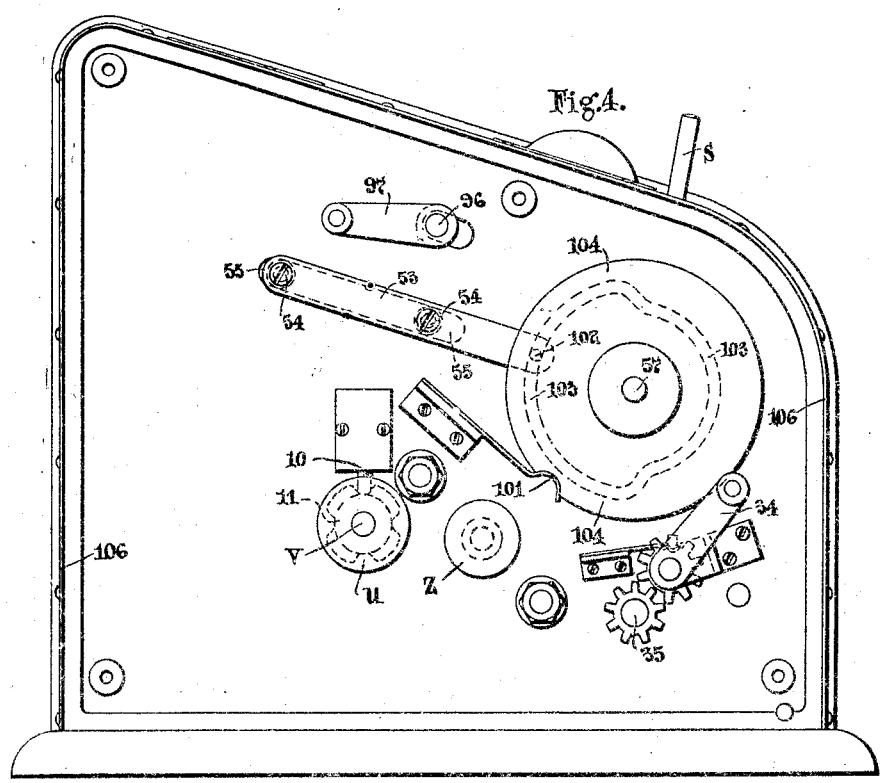

W. SCHOOLING.
ADDING AND SUBTRACTING MACHINE.
APPLICATION FILED MAR. 2, 1909.

977,333.

Patented Nov. 29, 1910
14 SHEETS—SHEET 5.

ATTEST:

INVENTOR.
WILLIAM SCHOOLING.
By Spear, Middleton, Donaldson & Spear,
ATTY'S.

W. SCHOOLING.
ADDING AND SUBTRACTING MACHINE.
APPLICATION FILED MAR. 2, 1909.

977,333.

Patented Nov. 29, 1910.
14 SHEETS—SHEET 6.

ATTEST.
INVENTOR.
WILLIAM SCHOOLING.

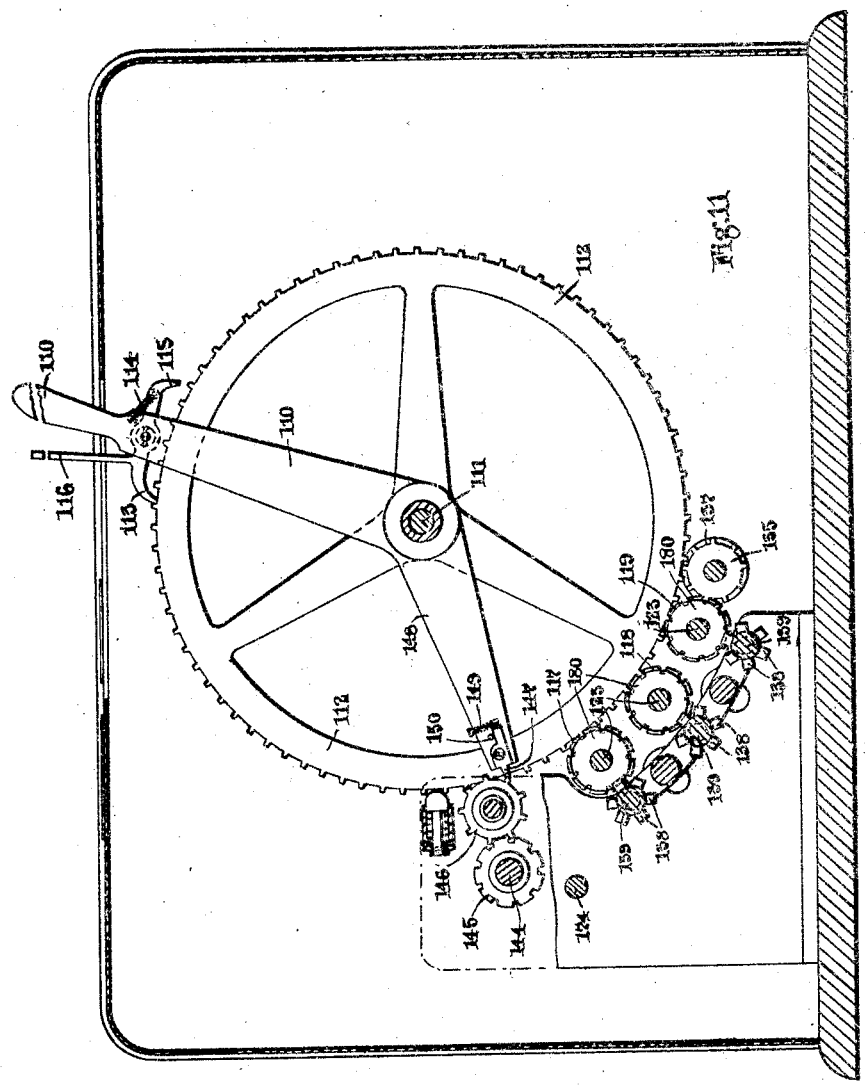

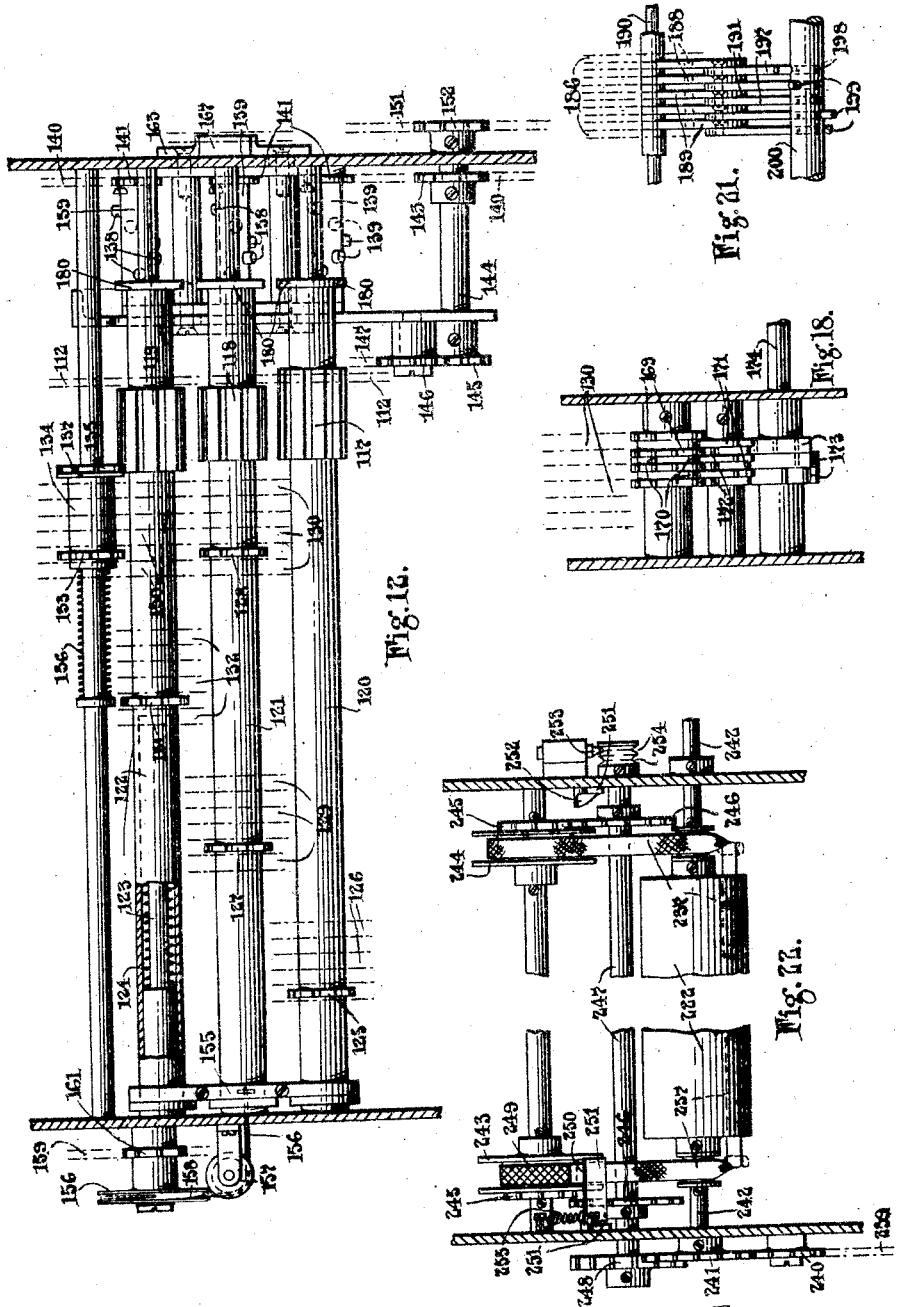
W. SCHOOLING.
ADDING AND SUBTRACTING MACHINE.
APPLICATION FILED MAR. 2, 1909.
977,333.
Patented Nov. 29, 1910.
14 SHEETS—SHEET 8.

W. SCHOOLING.
ADDING AND SUBTRACTING MACHINE.
APPLICATION FILED MAR. 2, 1909.
977,333.
Patented Nov. 29, 1910.
14 SHEETS—SHEET 10.
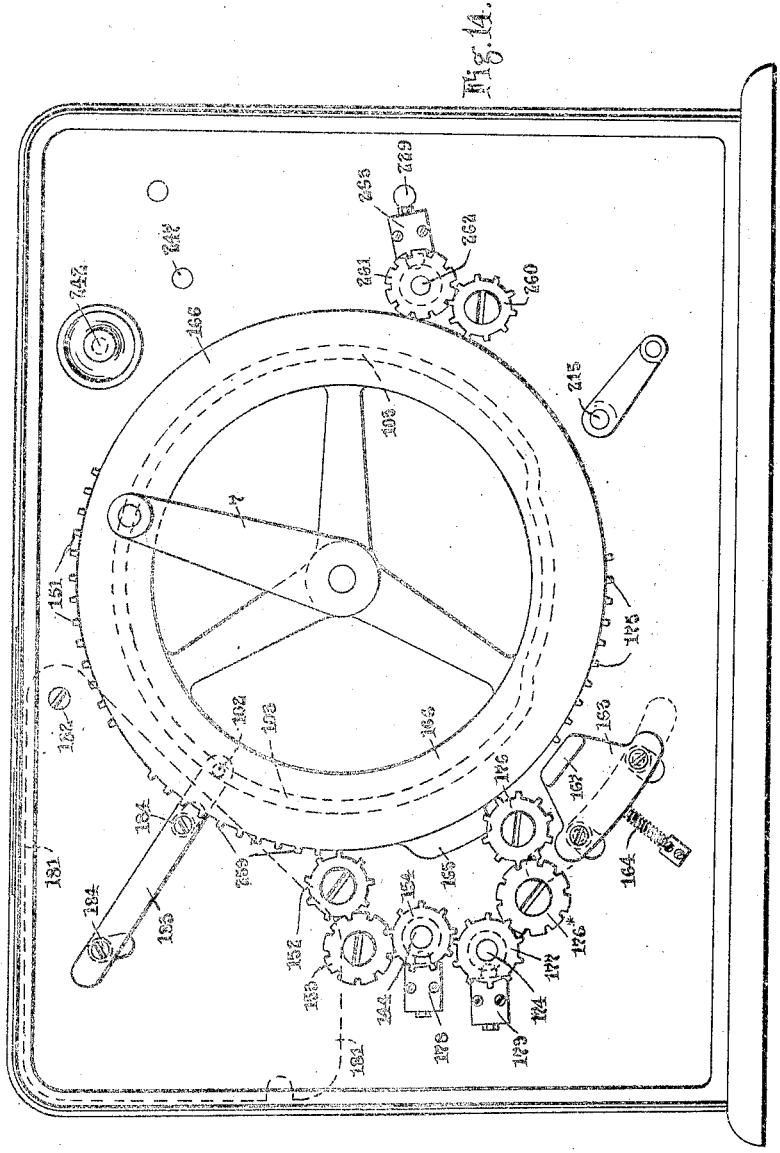
ATTEST.
Bent W. Stahl.
Edward N. Saxton.
INVENTOR.
WILLIAM SCHOOLING.
By Spear, Middleton, Donaldson & Spear
ATTYS.

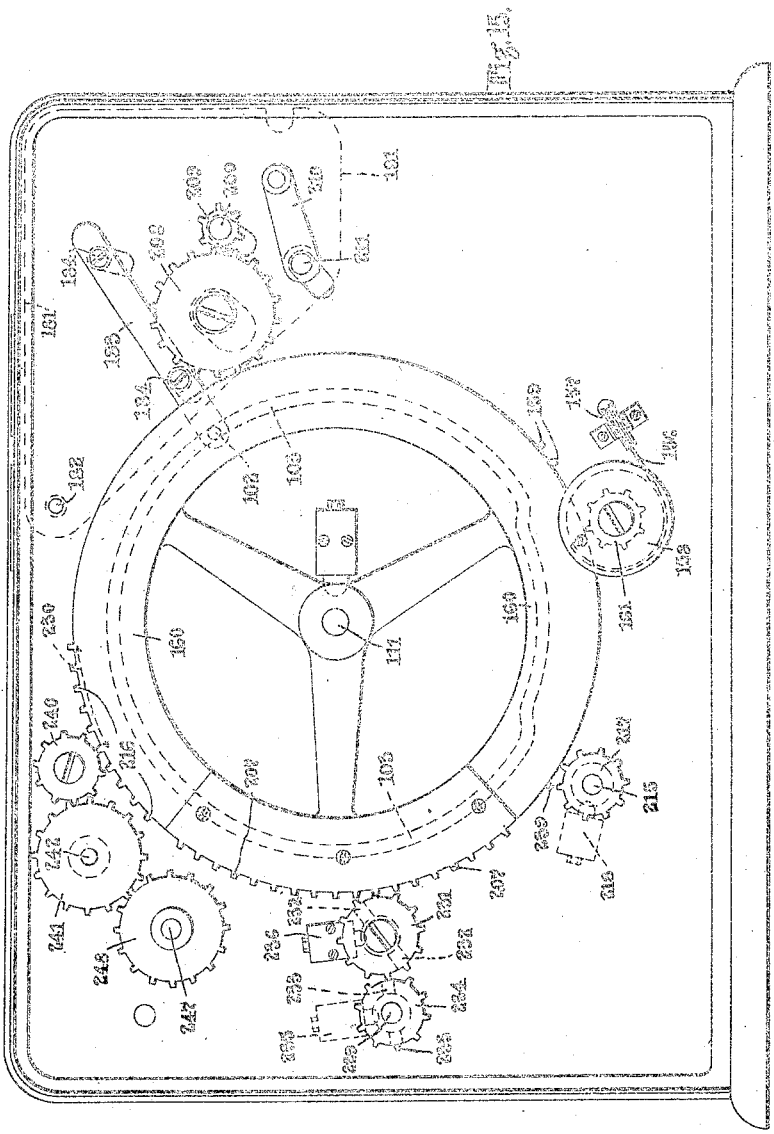

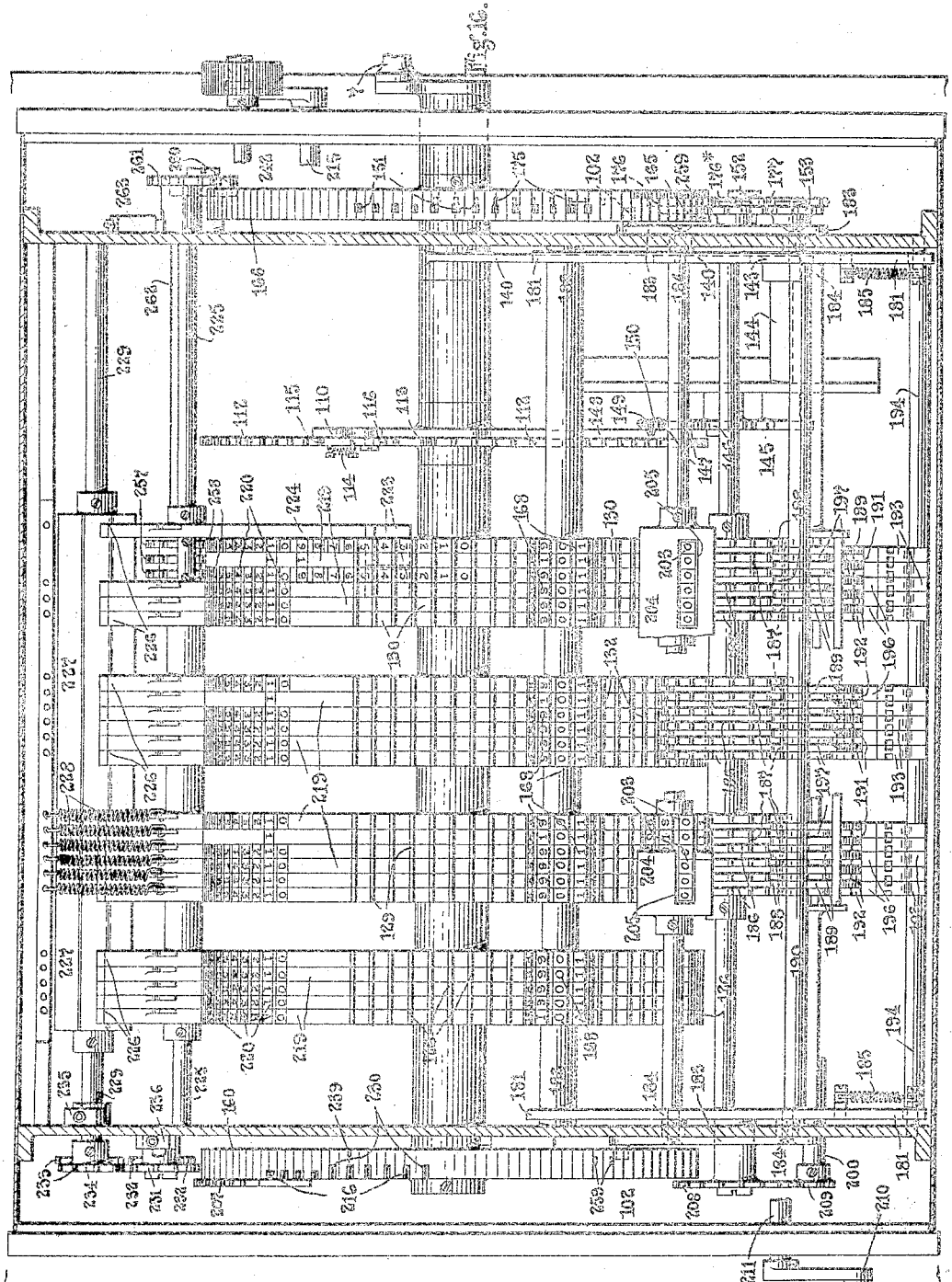

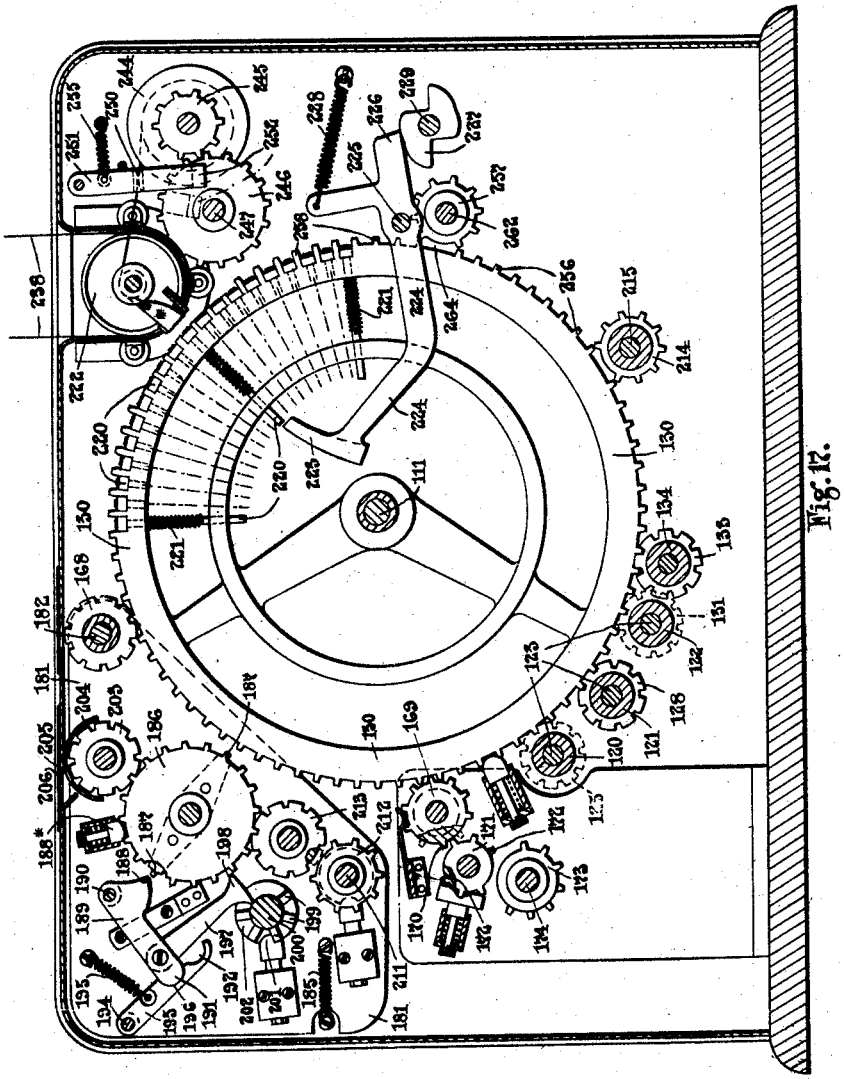

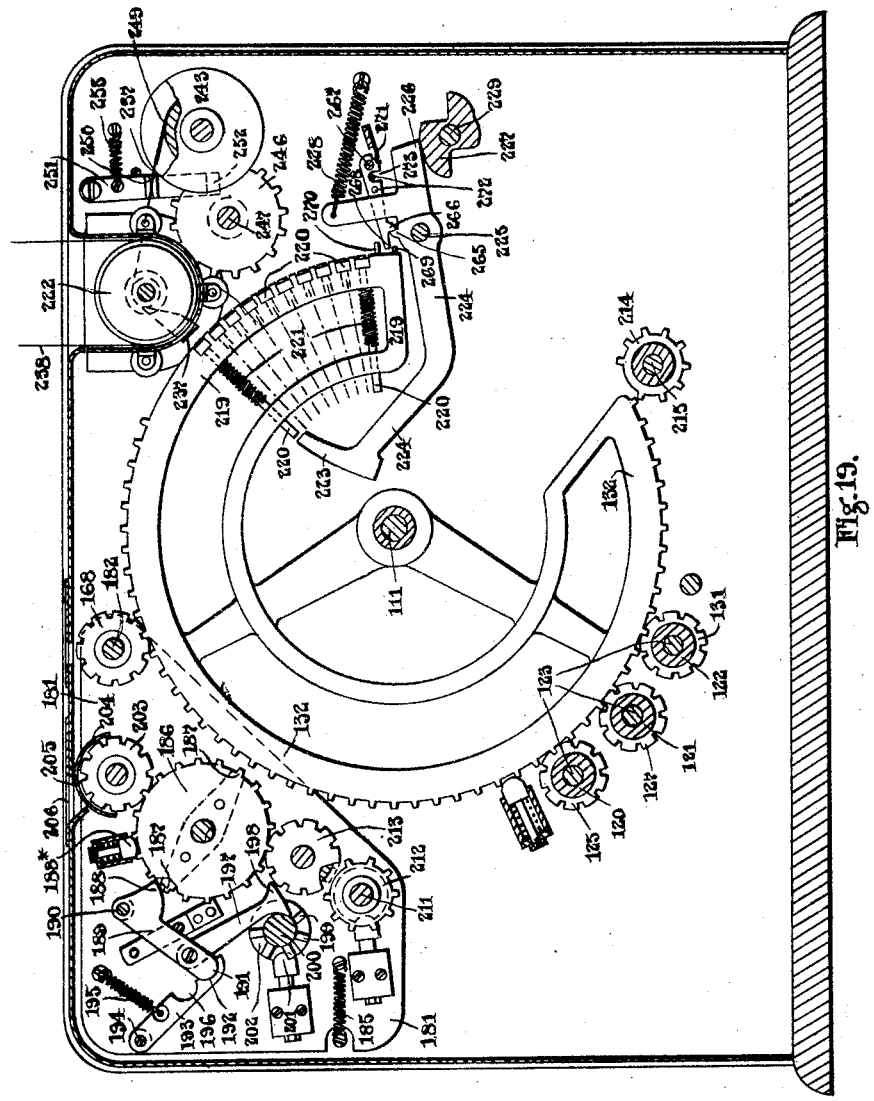

UNITED STATES PATENT OFFICE.

WILLIAM SCHOOLING, OF WESTMINSTER, LONDON, ENGLAND, ASSIGNOR TO THE SCHOOLING CALCULATING MACHINE COMPANY LIMITED, OF LONDON, ENGLAND.

ADDING AND SUBTRACTING MACHINE.

977,333.  Specification of Letters Patent.  Patented Nov. 29, 1910.

Application filed March 2, 1909. Serial No. 480,975.

*To all whom it may concern:*

Be it known that I, WILLIAM SCHOOLING, a subject of the King of Great Britain and Ireland, residing at 81 Page street, Westminster, London, S. W., England, have invented certain new and useful Improvements in Adding and Subtracting Machines, of which the following is a specification.

This invention relates to adding and subtracting machines the object being to provide a machine upon which gross and tare items can be successively added and the net automatically indicated, for instance, it is often desirable that the gross, tare and net weight of coal issuing from a colliery in trucks can be rapidly recorded and successive items added without necessitating the usual tedious process of making lists by hand and subtracting the tare items from the gross in order to obtain the net.

The invention consists in providing three sets of racks or disks respectively for gross, tare and net items and in so connecting the sets of racks or disks that when the gross item is set upon the gross set of racks it is simultaneously set on the net set, and then, when the corresponding tare item is set on the tare set of racks, it is automatically subtracted from the gross item on the net set of racks, and the result indicated thereon.

The invention also comprises special means for setting the various racks and the combination therewith of indicating totaling and printing mechanism as hereinafter referred to.

Figure 2:
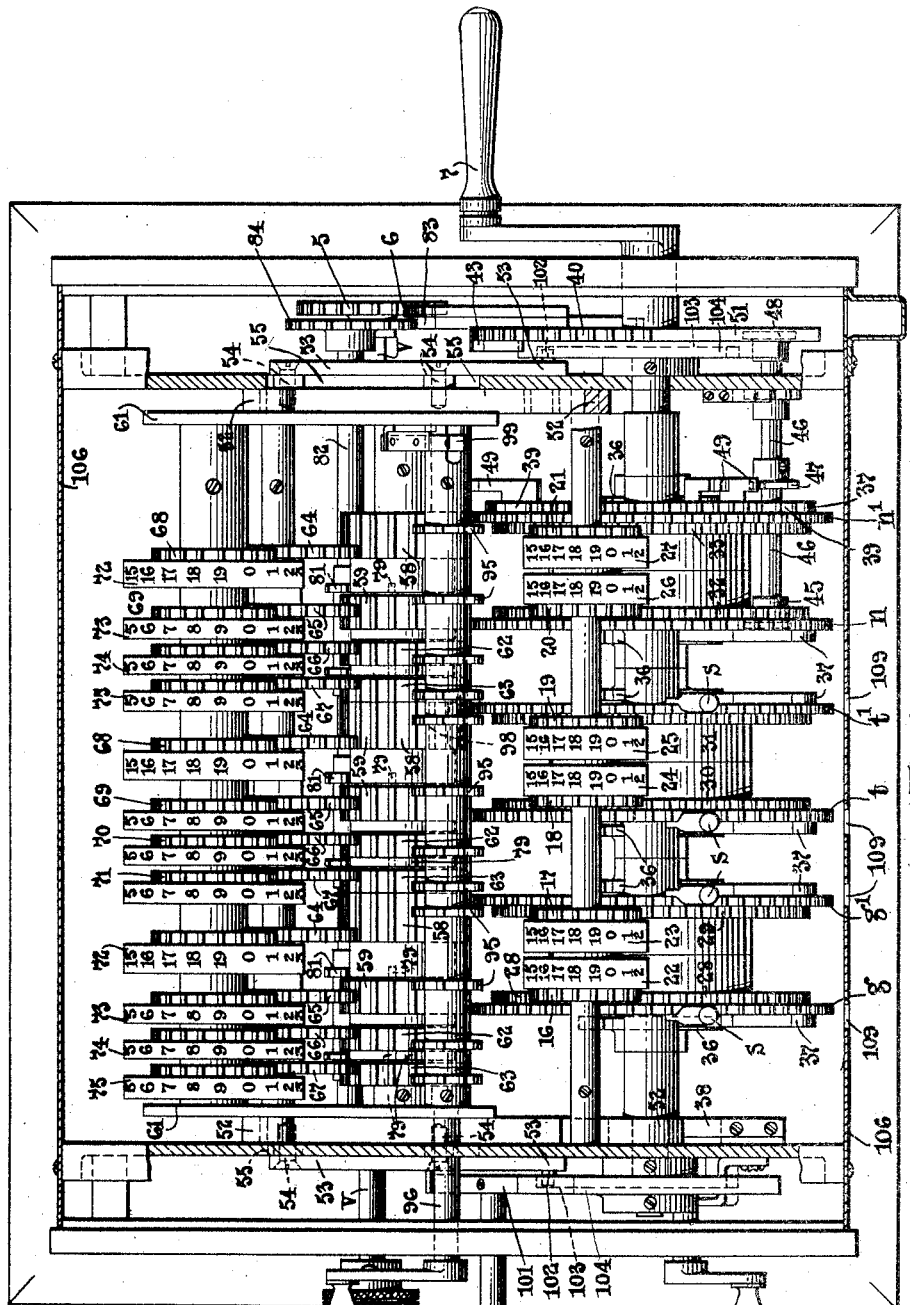
Figure 5:
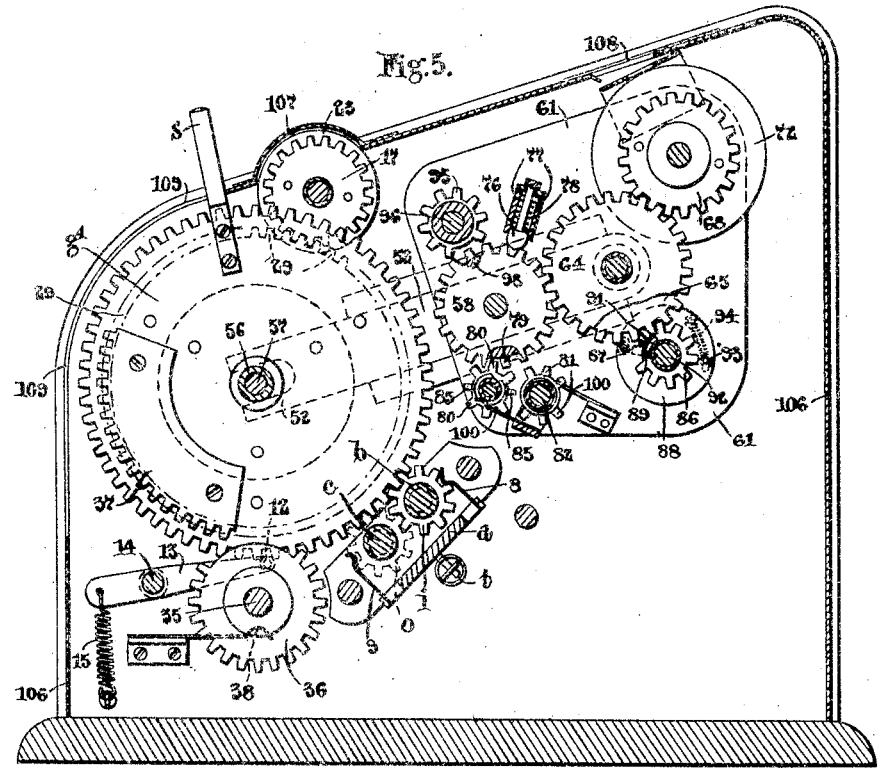
Figure 9:
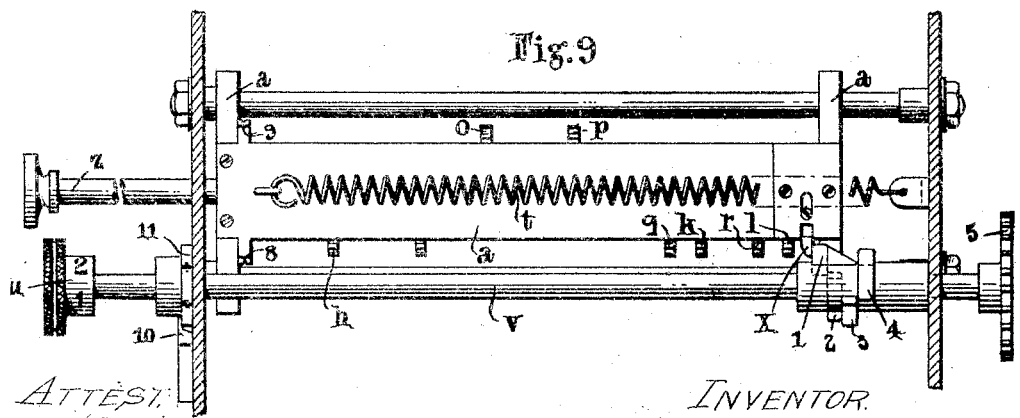
Figure 6:
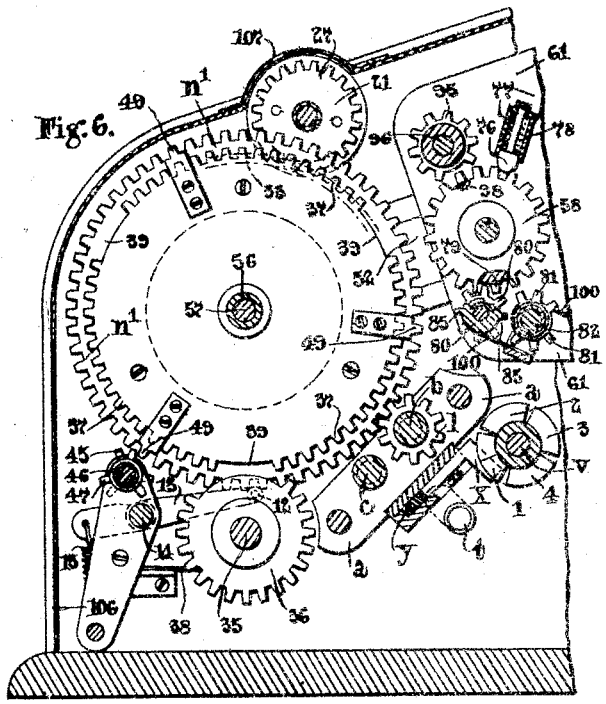
Figure 8:
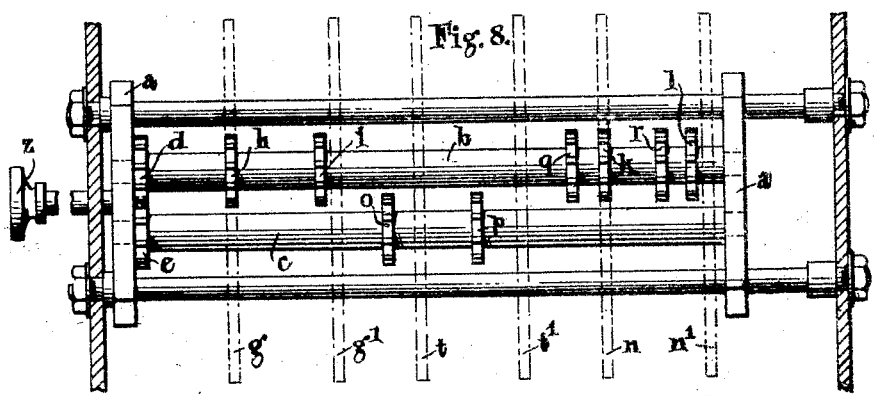
Figure 13:
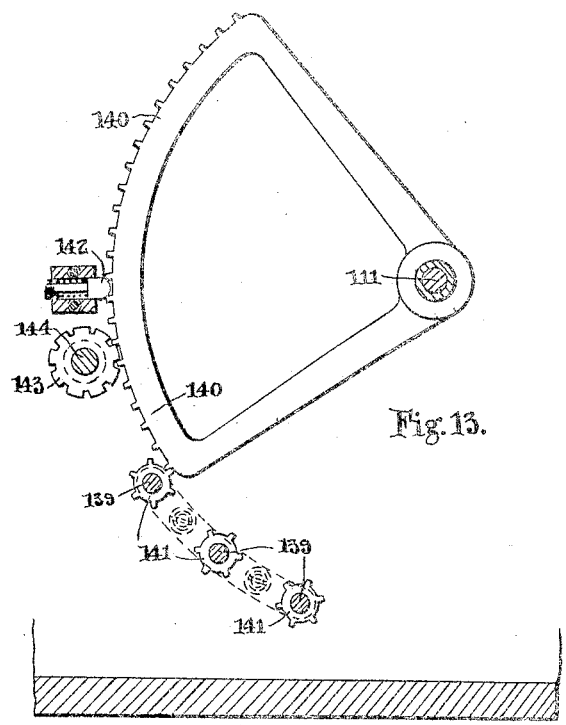
Figure 20:
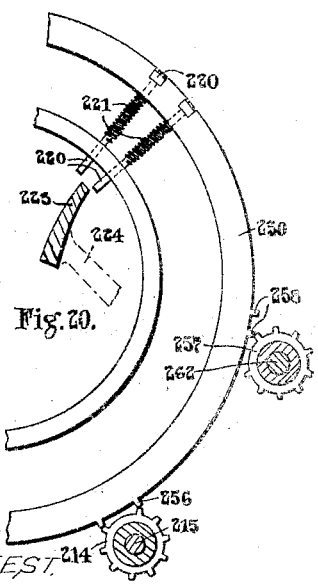
Figure 23:
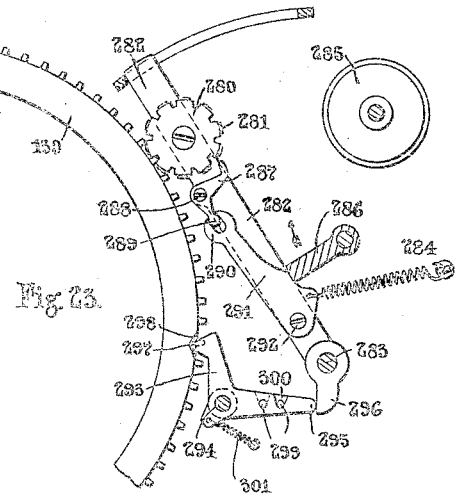

In the accompanying drawings, Figure 1 is a plan of one form of machine according to the invention. Fig. 2 being a plan with the casing removed. Figs. 3 and 4 are end elevations. Fig. 5 is a sectional elevation showing the gross mechanism. Fig. 6 being a similar view of the net mechanism. Fig. 7 is a rear view of the adding trains various parts being removed. Figs. 8 and 9 are respectively a plan and reverse plan of the traveling carriage. Fig. 10 is a section of a detail of the carrying on mechanism. Fig. 11 is an end sectional elevation of another form of machine wherein the setting of the racks is effected by a single lever. Fig. 12 is a plan of the means employed in the second form of machine for interconnecting the various racks. Fig. 13 being a view of an operating segment employed therewith. Figs. 14 and 15 are right and left hand end elevations respectively. Fig. 16 is a plan with the casing removed. Fig. 17 is a sectional end elevation showing a net rack. Fig. 18 is a front elevation of the carrying off or deducting mechanism in detail. Fig. 19 is a sectional end elevation showing one of the tare racks. Fig. 20 is a detail view of one of the net racks. Fig. 21 is a detail view of one set of carrying on mechanism. Fig. 22 is a detail plan of the ribbon and paper feed mechanism. Fig. 23 is a view of a modified form of printing mechanism.

In carrying out the invention according to one mode in the application to a machine adapted to deal with gross, tare and net weights totaling to thousands of tons a machine is constructed as is illustrated in Figs. 1 to 10. In this machine three sets of circular racks, $g\ g'$, $t\ t'$, and $n\ n'$, are loosely mounted on a common spindle and respectively represent the gross, tare and net items. The racks are conveniently mounted loosely on a sleeve, 56, loose on the main spindle, 57. Each of the gross and tare racks, $g\ g'$, $t\ t'$, is provided with a lever, $s$, by which it can be rotated through more or less degrees according to the item to be set. In order to aid the operator to accurately set each rack a scale may be provided on the casing of the machine, opposite to each lever $s$ and a roller 12, on a lever, 13, pivoted at 14, is pressed onto the teeth of the rack by a spring, 15, (Figs. 5 and 6). When an item is set on the gross racks, $g\ g'$, it is automatically and simultaneously set on the net set, $n\ n'$, and then when an item is set on the tare set, $t\ t'$, this latter item is deducted from that on the net set so that the difference or true net is set on the net set. This is effected by means of two shafts, $b$ and $c$, carried by a traveling carriage, $a$, (Figs. 8 and 9) and fitted with pinions adapted to first connect the gross and net sets of racks and then the tare and net. In order to effect this connection the shaft, $b$, is fitted with three pairs of pinions, $h\ i$, $i\ l$, $q\ r$, and the shaft, $c$, with one pair, $o\ p$. When an item is to be set on the gross racks, $g\ g'$, the tons rack $g$, is first rotated by its lever and the pinion, $h$, is in engagement with and rotated by the rack, $g$. The pinion, $k$, is at this time in engagement with the net tons rack, $n$, so that this latter is simultaneously set with the gross tons of the item. The carriage, $a$, is then allowed to travel forward as hereinafter described; a sufficient amount to move the pinions, $h\ k$, out of gear with their racks, $g$, $n$, and to move the pinions, $i\ l$, into gear with the racks, $g'$ and $n'$. The cwts. of the item are then set on the gross cwts. rack, $g'$, by rotating it through the requisite angle by means of its lever, $s$, whereupon the same item is simultaneously set on the rack, $n'$. Both sets of racks, $g\ g'$ and $n\ n'$, are thus set with the gross item. The carriage, $a$, is again moved forward. This time the pinions, $h\ i$, $k\ l$, are all out of gear, but the pinions, $o$ and $q$, are brought into gear with the tare and net racks, $t$ and $n$ respectively. The tons of the tare item is next set on the rack, $t$, but as the shaft, $c$, is geared to the shaft, $b$, by pinions, $e\ d$, the pinion, $q$, rotates the net tons rack, $n$, in the reverse direction to that in which it was previously rotated and the tare tons are thereby deducted. The carriage, $a$, is once more moved forward so as to throw the pinions, $p$ and $r$, into gear with the gross and net cwts. racks. The cwts. of the tare item being set on the rack, $t'$, the same are deducted from the net cwts. rack, $n'$. The true net is therefore set on the net racks. The three sets of racks, $g\ g'$, $t\ t'$, $n\ n'$, are thus set with the true gross, tare and net weights respectively, provided however that the cwts. set on the tare rack, $t'$, have not exceeded the cwt. previously set on the net rack, $n'$, by the gross rack, $g'$. In this case one ton has to be deducted from the net tons rack, $n'$, as hereinafter described.

In order to prevent overrunning of the pinions when the items are set suitable brakes are provided for instance, spring detents, 8 and 9 may engage the pinion, $c\ d$, Fig. 5.

The forward movement of the carriage, $a$, is effected by a spring, $f$, the carriage being released and its movement being limited by a series of cams, 1, 2, 3, 4, mounted on a shaft, $v$, fitted with an operating knob, $u$. The knob, $u$, is preferably engraved with numbers corresponding to the cams to indicate which is in its operative position, and a spring pressed plunger, 10, Fig. 4, engages in corresponding recesses in a collar, 11, on the shaft, $v$, to aid the operator in accurately determining the amount of rotation to be given each time to the knob. The carriage is arrested by a stop, $x$, which engages the cams in turn. It is pressed out by a spring, $y$, (Fig. 6,) which allows it to recede when the carriage is drawn back, after each complete operation, by a handle, $z$, the stop then sliding over the inclined side of the cam, 1.

As will be understood from the foregoing description the knob, $u$, is partially rotated after each part of an item is set on the gross and tare racks, the last partial turn bringing the cam, 1, back into its initial position although it is preferred to effect this automatically by providing the shaft, $v$, with a mutilated pinion, 5, adapted to be engaged by a short toothed segment, 6, rotated by the main operating handle, 7, hereinafter referred to.

The racks, $g\ g'$, $t\ t'$, $n\ n'$, gear respectively with pinions, 16, 17, 18, 19, 20, 21, formed integrally with or secured to indicating disks denoted respectively by numerals, 22 to 27. In the example shown the racks do not gear directly with the pinions, but indirectly through wheels indicated by numerals 28 to 33 and each indicating disk bears numerals, 0 to 19 on its periphery but obviously those on the tons disk may be increased when heavier weights or items of greater value are to be dealt with. In the event of any error being made in the setting of the racks they may be all returned or cleared to zero by the rotation of a handle, 34, on a spindle, 35, provided with a number of mutilated pinions, 36, adapted to mesh with toothed segments, 37, on the racks the clearing spindle, 35, being normally held by a spring brake, 38, in a position wherein the gaps in the pinions, 36, are opposite the segments, 37, so as not to interfere with the setting of the racks. The segments, 37, on the gross and tare racks, $g\ g'$, $t\ t'$, need only have teeth corresponding in number to the maximum number of teeth through which the racks are likely to be moved when set, i. e., in the example shown, that required to indicate 19 tons, 19 cwts. on the indicating disks.

As the net racks, $n\ n'$, are sometimes rotated through the maximum number of teeth in one direction and at other times an equal amount in the opposite direction the clearing segments contain more teeth and in the example shown each net rack has three clearing segments separated by gaps, 39.

The clearing spindle, 35, is rotated automatically in order to transfer each item to a totaling train as hereinafter described by a toothed segment, 40, operated by the main handle, 7, and adapted to engage a pinion, 41, on the end of the clearing spindle, 35. The pinion, 41, is provided with a gap, 42, to prevent operation except at the required time, the pinion being partially rotated so as to be brought into the path of the segment, 40, by a tooth, 43, engaging a few teeth, 44, at one side of the gap, 42.

When the tare cwts. of an item to be set exceed the gross cwts., a ton has to be deducted from the net tons rack, $n$, as before stated. This is effected by means of a small pinion, 45, provided with three teeth and mounted on a short spindle, 46, on which is a second small pinion, 47, having three teeth which however are arranged relatively midway between the teeth of the pinion, 45. A third small pinion, 48, is mounted on the spindle, 46, this pinion having three pairs of teeth, the pairs being separated by gaps. A number of trips, 49, are provided upon the net cwts. rack, $n'$, these trips being so arranged that one of them is always in a position ready to engage the three tooth pinion, 47, when the corresponding indicating disk, 27, is at zero. In the example shown wherein the net rack, $n'$, has 60 teeth, three trips, 49 are arranged at 120° apart. Thus when the net rack is moved backward past the zero position, as occurs when the tare cwts. exceed the gross cwts. in an item one of the trips, 49, moves the pinion, 47, and thereby rotates the pinion, 48, so as to bring one pair of teeth of the latter in the path of two teeth, 50, conveniently carried by a disk, 51, which also carries the clearing segment, 40. Thus when the main handle, 7, is revolved the teeth, 50, partially rotate the pinion, 48, and therefore the pinion, 45, which moves the net tons rack $n$, backward through one tooth.

After each item is set on the various racks it is transferred or added to a totaling mechanism which is intermittently brought into gear with the racks so that the transferring or adding operation can be effected by clearing the racks to zero. The totaling mechanism is conveniently mounted between two end plates, 61, to which sliding bars, 52, are secured to which in turn links, 53, are connected by screws, 54, passing through slots, 55, in the ends of the main casing. The links, 53, have pins, 102, engaging in cam slots, 103, in cam plates, 104, fixed on the main spindle, 57, rotated by the main handle, 7. The cam slots, 103, are so shaped and arranged that the totaling mechanism is brought into and out of gear with the racks when required.

The totaling mechanism comprised three sets of wheels for transferring or adding the gross tare and net items to the totaling disks as hereinafter described. Each set of wheels includes two wheels 58 and 59—representing the cwts. and units of tons and for engaging with the respective cwts. and tons racks— and two wheels, 62, 63, representing the tens and hundreds of tons. The four wheels, 58, 59, 62, 63 of each set mesh with intermediate wheels, 64, 65, 66, 67, which in turn mesh with wheels, 68, 69, 70, 71, on disks, 72, 73, 74, 75, bearing numerals representing the totals. The disks, 72 in the example shown bear numerals 0 to 19 whereas each of the others bears two sets of numerals 0 to 9. Each of the wheels, 58, 59, 62, 63, is provided with a brake, the brakes comprising plungers, 76, mounted between two plates, 77, and provided with springs, 78.

The carrying on from each cwt. wheel, 58, to the corresponding tons wheels, 59, is effected as follows: The boss of the cwts. wheel 58, is provided with a single tooth, 79, shown in Fig. 5, wherein part of the wheel, 58, is broken away to expose it to view. This single tooth, 79, once in every revolution of the wheel, 58, partially rotates a mutilated pinion, 80, having two sets of teeth separated by gaps. At each partial rotation of the pinion, 80, one set of teeth are brought into the path of three teeth on a mutilated pinion, 81, on a spindle, 82, which is rotated through one revolution by a segment, 83, Fig. 3, engaging a pinion, 84, on the spindle, 82, when the totaling mechanism has been moved out of gear with the racks. When the mutilated pinion, 81, is rotated it rotates the mutilated pinion, 80, through a partial revolution whereupon one of two diametrically opposite teeth, 85, on the boss of the pinion 80, engages the unit tons wheel, 59, and moves the latter on through the space of one tooth. An identical arrangement is used for carrying on from the tens wheels 62, to the hundreds wheels, 63, the parts being similarly lettered in the the drawings (Fig. 7). All of the pinions, 80, and one of the pinions, 81, have a spring brake or detent, 100, to hold them in their various set positions.

The carrying on from the units tons wheels, 59, to the tens wheels, 62, is not effected directly between these wheels but between the intermediate wheels, 65 and 66, in each case through the medium of pinions, 86, meshing with the wheels, 65, and single teeth, 87, carried by disks, 88. Each disk, 88, is loosely mounted on the boss 89 of a second disk, 90, Fig. 10, the boss, 89, being screwed to the boss, 91, of the pinion, 86, or being otherwise secured to the latter. Thus both the pinion, 86, and the disk, 90, are loose on the spindle, 92, but are secured together. One or more screws or pins, 93, connected to the disk, 88, projects through a slot in the disk, 90, so that a limited relative movement is allowed between the disks, to insure that the tooth, 87, is moved clear of the wheel, 66, after operating it to prevent said wheel from jamming with the tooth, this movement being resisted during the time that the tooth, 87, is moving the wheel, 66, onward by a spring, 94, secured to the screw or pin, 93 and to the disk, 90.

It will be seen from Fig. 5 that the tooth 87 is mounted slightly ahead of the corresponding tooth on the pinion, 86, and that when the said tooth, 87, comes into operation to move the wheel, 66, onward, it is moved backward, against the action of spring, 94, into the same line as the tooth or pinion, 86, so as to gear with wheel, 66, at the correct moment the spring 94, immediately the tooth, 87, has operated the wheel, 66, moving this tooth, 87, to its normal position clear of the wheel, 66, and insuring free movement of same. The totaling mechanism is cleared to zero when required by means of pinions, 95, mounted on a shaft, 96, fitted with a handle, 97, all the pinions gearing with the wheels, 58, 59, 62, 63, and having gaps adapted to coincide with gaps, 98, in the aforesaid wheels when the latter are in the zero or cleared position. The clearing shaft, 96, is provided with a spring brake or detent, 99, adapted to engage in a recess in the shaft to hold it in the normal or zero position. It will be understood that after each gross and tare item has been set by means of the levers, s, all the ensuing operations are automatically performed when one rotation is given to the main handle, 7, the latter being held in its normal position by a suitable spring brake or detent such as 101, adapted to engage in a recess in one of the cam plates, 104, (Fig. 4). These operations performed by the handle occur in the following order:—An item having been set on the gross and tare racks the handle, 7, is rotated from its normal position (Fig. 3) in the direction of the arrow. First, the segment, 6, rotates the pinion, 5, and resets the cam shaft, r, so that the traveling carriage, a, can move forward slightly into an inoperative position ready to be returned for the setting of the next item. The teeth, 50, then engage the pinion, 48, and effect any deduction on the net ton rack if required. The cam slots, 103, next draw the totaling mechanism into gear with the racks this movement being immediately followed by the rotation of the pinion, 41, on the clearing shaft, 35, by means of the segment, 40, so that the racks are cleared to zero and the item cleared is transferred or added to the totaling trains. The totaling mechanism is then pushed back by the cam slots, 103, and any carrying on required in the totaling mechanism is effected by the segment, 83, rotating the pinion, 84, after which the spring brake or detent, 101, engages in its recess and retains the handle, 7, in its normal position of rest.

The whole of the machine is preferably inclosed in an outer casing, 106, provided with two sets of apertures, 107 and 108, through which the correct numerals of the indicating disks may be seen and also with slots, 109, for the levers, s, as seen in Fig. 1. Suitable inscriptions may be provided directly on the casing or on plates secured thereto denoting the gross, tare and net disks.

When it is required to make a record of the items suitable printing mechanism may be combined with the machine for instance that described in conjunction with an adding machine in my specification.

In carrying out the invention according to another mode, instead of separately setting each rack directly by means of a lever attached thereto as in the example above referred to, a single operating lever is used to set all the racks. For example as illustrated in Figs. 11 to 22, a single operating lever, 110, is loosely mounted on a shaft, 111, upon which a single setting wheel, 112, is also loosely mounted. The lever, 110, is provided with a pivoted pawl, 113, held in engagement with the wheel, 112, by a spring, 114. A second and reverse pawl, 115, is provided integral with the pawl, 113, and by means of a lever, 116, the forward pawl, 113, can be drawn out of gear and the rearward pawl, 115, thrown in when it is desired to move the setting wheel back for any purpose.

The setting wheel, 112, is adapted to mesh in succession with three long pinions, 117, 118, 119, mounted on three shafts respectively referred to hereinafter as the reference shaft, 120, the gross shaft, 121, and the tare shaft, 122. Each of these shafts is in the form of a sleeve mounted loosely on a fixed shaft, such as 123, Fig. 12. Each sleeve is adapted to travel longitudinally in one direction under the action of a spring, 124, when released step by step as hereinafter described. The reference shaft, 120, is provided with a pinion, 125, adapted to be brought successively into mesh with a set of circular reference racks, 126, so that any reference letter, number or indication for instance the reference number of a wagon can be set thereon.

The gross shaft, 121, is provided with two pinions 127, 128, adapted to be brought simultaneously and successively into engagement with the corresponding racks of a gross set of racks, 129, and a net set, 130.

The tare shaft, 122, is provided with a pinion, 131, adapted to be brought successively into mesh with the racks of a tare set of racks, 132. Simultaneously with this a pinion, 133, is also adapted to be brought successively into mesh with the net set of racks, 130, the pinion, 133, being mounted on a sleeve, 134, provided with an intermediate and therefore reversing pinion, 135, meshing with and adapted to follow up the long pinion, 119, on the tare shaft 122, under the action of a spring, 136, a collar, 137, on the pinion, 135, abutting against the end of the long pinion, 119. Thus when an item is set on the gross racks, 129, it is also set on the net racks, 130, and when a tare item is set on the tare racks, 132, it is deducted from the net set, 130.

The requisite step by step longitudinal motion of the shafts, 120, 121, 122, is permitted in correct sequence, after the setting of each digit by stops, 138, arranged in a helical manner on stop shafts 139, the stops engaging and arresting collars, 180, on the shafts, 120, 121, 122. The stop shafts 139, are rotated in correct sequence and through the correct amount by a toothed segment, 140, Fig. 13, which meshes with pinions, 141, on the ends of the stop shafts. The segment, 140, which is retained in each position by a spring pressed plunger, 142, is shifted tooth by tooth by means of a pinion, 143, mounted on a shaft, 144, Fig. 12, upon which is also mounted a pinion, 145, meshing with a pinion, 146, which is rotated through the space of one tooth by a pawl 147, on an arm, 148 of the operating lever, 110, every time the latter is returned after each setting operation. The pawl, 147, is pivoted and can move about its pivot against the action of a spring, 149, when the arm moves forward the pawl then slipping over the teeth of the pinion, 146. It is prevented from slipping in the other direction by a stop, 150. The shaft 144, is rotated in a reverse direction, when all the racks have been set, by a toothed segment, 151, (Fig. 14) rotated by the main handle, 7, the segment, 151, engaging a pinion, 152, which through an intermediate pinion, 153, rotates a pinion, 154, on the shaft, 144. When the shaft, 144, is thus reversed it returns the segment 140, and the latter returns all the stop shafts, 139, to their initial positions. The shaft, 144, is held in its normal position by a spring pressed plunger, 178, Fig. 14.

The shafts, 120, 121, 122, are drawn back when required by a plate, 155, Fig. 12, attached to a cable, 156, passing over a guide pulley, 157, onto a winding pulley, 158, which is rotated at the correct time by teeth, 159, on a wheel, 160, engaging a pinion, 161, connected with the pulley, 158, Figs. 12 and 15. In order, however, to enable the collars, 180, to pass back over the stops, 138, the outer ends of the stop shafts, 139, are mounted in a plate, 163, Fig. 14, which can be depressed against a spring, 164, by a cam, 165, on a wheel, 166, engaging a flange, 167, on the plate, 163, this depression occurring and lasting when and as long as the shafts, 120, 121, 122, are being drawn back. In the example now being described there are five reference indicating disks, 168, Fig. 16, one bearing letters and four bearing numerals although any other number may be used and may bear any desired characters. These disks mesh directly with the corresponding reference racks. Obviously no totaling mechanism is required for these racks or disks. Six racks are used in each of the gross tare and net sets of racks, i. e., a units cwts., a tens cwts., and units, tens, hundreds and thousands of tons. Obviously no carrying on mechanism is required between these racks but as in the first machine described, carrying off or deducting mechanism is required for some of the net racks, to operate when the tare cwts. set on the net racks exceed the gross cwts. set on the net racks. This mechanism is required in the present example between the units cwts., tens cwts., units tons and tens tons racks. Suitable mechanism is shown in Figs. 17 and 18. It comprises a number of loosely mounted pinions, 169, each having ten teeth meshing with the net racks just referred to, the first three pinions, 169, also having single teeth, 170, for engaging with pinions, 171, the teeth of which are divided into two sets by gaps. Each of the pinions, 171, also has a single tooth, 172, for rotating the next succeeding pinion, 169, through one tooth. This is effected when one of the pinions, 169, has been turned backward through a larger number of teeth than in the forward direction, which occurs when the tare cwts. set on the net racks exceed those set by the gross racks. When this takes place the single tooth, 170, trips the corresponding pinion, 171, so as to bring one set of teeth of the latter into the path of the teeth of a mutilated pinion, 173, on a shaft, 174. The latter is rotated at the correct time by a segment, 175, Fig. 14, engaging a pinion, 176, motion from which is transmitted to the shaft, 174, by pinions, 176*, 177. The shaft, 174, is held after each rotation by a spring pressed plunger, 179.

The pinion, 169, for the tens cwts. rack is provided not only with a single tooth, 170 at its side but a similar tooth, 170, Fig. 18, adjacent to every alternate tooth of the pinion because one has to be deducted from the tens cwts. rack each time the tare units cwts. exceeds the gross units cwts. and obviously the tens cwts. racks never move more than one tooth at a time their indicating disks simply bearing the characters 0 and 1.

After each item has been set on the various racks in the manner hereinbefore described it is transferred to totaling mechanism. This mechanism in the example shown is mounted between end plates, 181, Figs. 17 and 19, which are pivoted loosely for convenience on a shaft, 182, the mechanism being swung about this shaft by means of cam slots, 103, in which pins or rollers, 102, engage, the latter being carried on the ends of links, 183, directly connected to the end plates, 181, by screws, 184, passing through slots in the end plates of the main casing, a spring, 185, tending to hold the totaling mechanism out of gear.

The totaling mechanism shown comprises three sets of six toothed wheels, 186, each having for convenience twenty teeth, one set being provided for and engaging with the gross, tare and net racks respectively. Integral with or secured to the side of each wheel, 186, are two carrying teeth, 187, diametrically opposite each other, except however the wheel, 186, corresponding to the tens cwts. rack which wheel is provided with a carrying tooth, 187, adjacent to every alternate tooth. A spring brake plunger, 188, engages each wheel, 186. Each carrying tooth, 187, engages at the correct time with a nose, 188, on a lever, 189, loosely pivoted on a shaft or rod, 190, and having a rounded free end, 191, which normally rests in a recess, 192, in a lever, 193, pivoted at 194, and held up by a spring, 195, as shown in Figs. 17 and 19. Whenever the lever, 189, is rocked by a carrying tooth, 187, its free end, 191, is shifted into a second recess, 196, in the lever, 193, (Fig. 17) with the result that a pawl, 197, pivoted to the lever 189, is brought into a position wherein its end, 198, can be engaged by a pin, 199, on a carrying shaft, 200, when the latter is rotated and the end, 198, can be thrust into engagement with the next succeeding wheel, 186, to move it forward one tooth. On this forward movement of the pawl the lever, 189, is brought back into its normal inoperative position in the recess, 192. The pins, 199, are arranged in a helical manner on the carrying shaft, 200, in order that the carrying on between the wheels, 186, can occur successively. A spring brake plunger, 201, engages in a recess in a collar, 202, on the carrying shaft to hold it in its normal position. The wheels, 186, gear directly with totals indicating disks, 203, which are arranged below a cover, 204, having apertures, 205, in order that only the correct characters can be seen through the apertures, 206, in the main casing. The carrying shaft, 200, is rotated at the correct time by a toothed segment, 207, (Fig. 15) engaging an intermediate wheel, 208, meshing with a pinion, 209, on the end of the shaft, 200.

The totals mechanism can be cleared to zero by turning a handle, 210, on a clearing spindle, 211, (Fig. 15) thereby rotating pinions, 212, (Figs. 17 and 19) which rotate intermediate pinions, 213, meshing with the wheels, 186. The pinions, 213, have broad teeth whereas the pinions, 212, have narrow teeth. Each pinion, 213, has a gap extending part way across so as to leave sufficient tooth to engage with the wheel, 186, but insufficient to engage at this point with the pinion, 212, which also has a gap which is normally opposite the pinion, 213, so that the pinion 212, is not rotated when the totals are being transferred to the wheels, 186. The half tooth on the pinion, 213, is removed in Fig. 19 in order to show the gap behind it, but it is indicated in dotted lines. The items are transferred to the totaling mechanism by clearing the gross tare and net racks to zero which is effected by pinions, 214, Figs. 17 and 19, meshing with the racks and mounted on a clearing shaft, 215, which is rotated by a toothed segment, 216, Fig. 15, adapted to engage a pinion, 217, on the end of the clearing shaft. This shaft is also provided with a spring brake plunger, 218.

When it is desired to make a record of the separate items and the totals, a suitable printing mechanism is used, for instance the racks are provided with extensions, 219, Fig. 19, in which sets of type plungers 220, are radially arranged. The plungers are provided with return springs, 221, and they are so arranged in relation to the teeth on the racks that the type corresponding to the numbers or other characters indicated by the indicating disks, 168, will be opposite a platen, 222. The inner ends of the said plungers will when in this printing position be opposite hammer heads, 223, formed on levers, 224, pivoted on a shaft, 225, and having heels, 226, held by springs, 228, in engagement with cams, 227, fixed on a shaft, 229. At the correct time the shaft, 229, is rotated through half a revolution so that the cams, 227, first raise the heels, 226, tension the springs, 228, and then suddenly release the heels to allow the springs to bring the hammer heads, 223, against the line of plungers, 220, opposite them. The shaft, 229, is rotated by a toothed segment, 230, Fig. 15, engaging a pinion, 231, which is fitted with two diametrically opposite single teeth, 232, adapted to engage similar teeth, 233, on a pinion, 234, fixed on the shaft, 229. The pinion, 234, has two diametrically opposite gaps so that it can only be turned each time through half a revolution, the shaft being retained in each position by a spring brake plunger, 235, the spindle of the pinion, 231, also having a spring brake plunger, 236. When one of the teeth, 232, engages one of the teeth, 233, it rotates the pinion 234, sufficiently to bring the normal teeth of the latter into mesh with the normal teeth of the pinion, 231, so that the latter can rotate it through half a revolution until the gap comes opposite to it.

When the type plungers are struck by the hammers the type strike an inking ribbon, 237, Figs. 17 and 19, against the paper web, 238, on the platen, 222. The web, 238, is fed forward after each item is printed by a tooth, 239, Fig. 15, engaging a pinion, 240, which through a pinion, 241, partially rotates a shaft 242, on which the platen, 222, is mounted. The inking ribbon, 237, is fed from one spool, 243, to another, 244, Figs. 17, 19 and 22, either of which can be put into operation. Each has a pinion, 245, adapted to be put into or out of mesh with a corresponding pinion, 246, on a shaft, 247, which can slide longitudinally. The shaft, 247, is rotated intermittently by the pinion, 241, on the platen spindle before referred to, the pinion, 241, engaging a pinion, 248, on the shaft, 247. When the latter shaft is slid axially the pinions, 241, and 248, remain in gear but one or other of the pinions, 245, is disengaged from its pinion, 246, so that the ribbon can be fed off one spool onto the other. The axial movement of the shaft, 247, is effected automatically by protuberances near the ends of the ribbon for instance pieces of thick tape, 249, which are unable to pass through slots, 250, in levers, 251, through which slots the ribbon can pass freely. Thus when the ribbon has been nearly unwound from one spool the corresponding lever, 251, is rocked against the action of a spring, 255, and by means of a cam, 252, on its end engaging the boss of the corresponding pinion, 246, thrusts the shaft, 247, axially, the converse operation occurring at the other end when the ribbon has completed its travel in the opposite direction. A spring plunger, 253, engages in either of two grooves, 254, to retain the shaft, 247, in each position.

Owing to the fact that the three net racks of lowest value are sometimes moved backward, for instance, when the tare items set on these racks exceed the gross items, they must be provided with two sets of type, otherwise, owing to the backward rotation of the racks when a deduction occurs the positive series of type would be removed from the platen. The order of the type in the two sets which may be conveniently termed the positive and negative sets, is indicated by small numerals in Fig. 16. As the last mentioned of the net racks are complete circles the hammer lever for the tens tons type is provided with an extra head for striking the units tons type, and one hammer lever is provided with a head large enough to strike the tens and units cwts. type.

When any of the negative set of type are brought to the printing line and it is desired to clear the racks to zero when transferring an item to the totaling mechanism it is necessary that the racks shall continue to rotate in the same direction, hence the zero of the negative set of type is by this clearing operation brought to the printing line. This clearing is effected by the pinion engaging an auxiliary segment or set of teeth, 256. After the item has been transferred to the totaling mechanism the latter is thrown out of gear. The three net racks referred to are returned to their normal position by a pinion, 257, engaging a third segment or set of teeth, 258, the pinion, 257, being rotated in the correct order by a segment 259, Fig. 14, engaging a pinion, 260, meshing with a pinion, 261, on the same shaft, 262, as the pinion, 257. The shaft, 262, is provided with a spring brake plunger, 263, which holds the shaft in such a position that a gap in the pinion, 257, is opposite the gap, 264, at the end of the segment or teeth, 258, thus insuring that the correct zero type will be opposite the printing line. This second set of type can be avoided if when a negative part of the rack is on the printing line the rack is moved back through ten teeth so as to bring the corresponding positive portion of the rack onto the printing line. Any simple mechanism may be used for this purpose.

In order to avoid the unnecessary and confusing printing of the naughts to the left of the digit of highest value of an item, the hammers corresponding to these naughts are adapted to be locked, or in other words only the hammers necessary for the digits required to be printed are released. Each hammer except those for the three net racks of lowest value is provided with a tooth, 265, normally engaged by a detent, 266, pivoted at 267. The detent has an extension, 268, adapted to be engaged by pins, 269, 270, on the respective rack, the former disengaging the detent to release the hammer whenever the rack is moved from its zero position and the other bringing the detent back into engagement with the tooth, 265, whenever the rack is moved back into its zero position. A spring brake 271, holds the detent in either of the positions into which it may be moved.

Whenever a detent is raised it simultaneously raises the detent immediately to its right hand i. e. that representing the digit of next lower value, but it does not affect the detent to the left. This raising of the neighboring detent is effected by a pin, 272, engaging in a slot, 273, beneath the next detent. In this way all the detents to the right of that corresponding to the digit of highest value are raised and the respective hammers are released so that naughts as well as other digits to the right of that of highest value in an item are printed.

An alternative form of printing mechanism is illustrated in Fig. 23, in which each rack is adapted during the setting of an item, to gear with a wheel 280 provided with type numerals, 281, on its periphery, so that according to the digit of an item set on the rack, the wheels, 280, are rotated to bring the corresponding type numeral, 281, into the printing position. Each type wheel, 280, is rotatably mounted on a plate or lever, 282, pivoted at 283, and adapted to move, under the action of a spring, 284, to sharply strike the type numeral against a platen, 285, when released by a bar, 286, rotated by any suitable means from the main operating handle, the levers, 282, being guided by slots in a plate, 302. Each type wheel, 280, is free to rotate when it is in gear with its corresponding rack, but during the printing operation it is adapted to be locked in the position set, by means of a pawl, 287, pivoted at 288 and having its end, 289 in engagement with the forked end, 290, of a lever, 291, pivoted at 292, and adapted to move under the action of the spring, 284, on the first movement of the bar, 286, and before its type wheel, 280 is moved out of engagement with the rack.

It will be seen that the wheels, 280 are rotated to the correct printing position during the setting operation after which the main operating handle is rotated which in turn rotates the bar, 286, to first release the levers, 291, to throw the pawls, 287 into position to lock their respective wheels, 280, and then to release the levers, 282, which move under the action of the springs, 284, and print the item on a suitable paper strip on the platen, 285. On further rotation of the operating handle the levers, 282, are first returned to their normal position and then the pawls, 287, are released from their wheels, 280, to allow them to be returned to normal position when the racks are returned to zero. To prevent the printing of naughts to the left of an item each lever, 282, is adapted to be locked when its corresponding rack is not moved by a detent, 293, pivoted at 294 and having one end, 295, normally engaging a heel, 296, on the plate, 282, the other end, 297, engaging a recess, 298, in the periphery of the rack. Immediately a rack is moved its detent 293 is moved to release the heel, 296, of the corresponding plate, 282, and by means of pins, 299, and slots, 300, to release all those detents to the right, but to leave those to the left in the locked position. Springs, 301, restore the detents, 293, to normal position.

Claims.

1. In an adding machine, the combination of three sets of racks, adapted respectively for gross, tare and net items, traveling mechanism having means for connecting the racks, and means for imparting a step-by-step movement to the said traveling mechanism, whereby the racks are connected in proper sequence.

2. In an adding machine, the combination of three sets of racks, adapted respectively for gross, tare and net items, traveling mechanism having means for connecting the racks, means for imparting a step-by-step movement to the said traveling mechanism, whereby the racks are connected in proper sequence, and means for directly setting the items upon the gross and tare racks.

3. In an adding machine, the combination of three sets of racks, adapted respectively for gross, tare and net items, traveling mechanism having means for connecting the racks, a single setting lever, means operable by said lever for setting the items upon the racks, and means operable by said lever for imparting a step-by-step movement to the said traveling mechanism whereby the racks are connected in proper sequence.

4. In an adding machine, the combination of three sets of racks, adapted respectively for gross, tare and net items, traveling mechanism having means for connecting the racks, means for imparting a step-by-step movement to the said traveling mechanism, whereby the racks are connected in proper sequence, means for setting the items upon the racks, a totaling mechanism, means for bringing said totaling mechanism into gear with the racks after they have been set, and means for clearing the racks to zero to transfer the item set to the totaling mechanism.

5. In an adding machine, the combination of three sets of racks, adapted respectively for gross, tare and net items, traveling mechanism having means for connecting the racks, means for imparting a step-by-step movement to the said traveling mechanism whereby the racks are connected in proper sequence, means for setting the items upon the racks, and deducting mechanism for the net racks.

6. In an adding machine, the combination of three sets of racks, adapted respectively for gross, tare and net items, traveling mechanism having means for connecting the racks, means for imparting a step-by-step movement to the said traveling mechanism, whereby the racks are connected in proper sequence, means for setting the items upon the racks, and means for printing the items so set upon the racks.

7. In an adding machine, the combination of three sets of racks, adapted respectively for gross, tare and net items, traveling mechanism having means for connecting the racks, means for imparting a step-by-step movement to the said traveling mechanism, whereby the racks are connected in proper sequence, means for setting the items upon the racks, means for printing said items, and means for preventing the printing of naughts to the left of the digit of highest value in an item.

8. In an adding machine, the combination of three sets of racks, adapted respectively for gross, tare and net items, traveling mechanism having means for connecting the racks, means for imparting a step-by-step movement to the said traveling mechanism, whereby the racks are connected in proper sequence, means for setting the items upon the racks, type carried by the racks, means operating said type for printing the items, a plurality of type carried by certain of the net racks, and means for returning said net racks to their normal position.

9. In an adding machine, the combination of three sets of racks, adapted respectively for gross, tare and net items, traveling mechanism having means for connecting the racks, means for imparting a step-by-step movement to the said traveling mechanism, whereby the racks are connected in proper sequence, means for setting the items upon the racks, a totaling mechanism, printing mechanism, deducting mechanism, means for returning the racks to zero, a single operating handle, and means whereby the said operating handle is connected, in proper sequence, with the said mechanisms.

In testimony whereof, I affix my signature in presence of two witnesses.

WILLIAM SCHOOLING.

Witnesses:
A. W. MATHYS,
B. H. MATTHEWS.